United States Patent [19]

Hornady

[11] Patent Number: 4,730,509

[45] Date of Patent: Mar. 15, 1988

[54] BREAKAWAY CONTROL LEVERS

[76] Inventor: Robert S. Hornady, 1437 Lillian, Livermore, Calif. 94550

[21] Appl. No.: 63,719

[22] Filed: Jun. 15, 1987

Related U.S. Application Data

[63] Continuation of Ser. No. 726,791, Apr. 24, 1985, abandoned.

[51] Int. Cl.⁴ .............................................. F16C 1/10
[52] U.S. Cl. ........................................ 74/501 B; 74/523; 16/114 R
[58] Field of Search ................... 74/501 R, 488, 484, 74/543, 560, 526, 473 P, 523; 16/114 R, 24, 25, 41; 403/2, 327, 328, 161, 166, 146; 384/245, 420, 907.1; 188/2 D, 24.22; 248/900

[56] References Cited

U.S. PATENT DOCUMENTS

| | | | |
|---|---|---|---|
| 659,138 | 10/1900 | Dring et al. | 74/489 X |
| 961,442 | 6/1910 | Hartzell | 74/560 X |
| 1,572,142 | 2/1926 | Hood | 403/328 X |
| 2,472,442 | 6/1949 | Schueler | 74/489 |
| 2,652,909 | 9/1953 | Knell | 16/114 R X |
| 2,693,117 | 11/1954 | Hobart | 74/523 |
| 2,721,090 | 10/1955 | Kaman | 403/328 |
| 3,378,273 | 4/1968 | Lewis et al. | 403/328 X |
| 3,484,894 | 12/1969 | Fletcher | 16/114 R |
| 3,561,281 | 2/1971 | Wilfert | 74/473 |
| 3,602,245 | 8/1971 | Meisel | 74/527 X |
| 3,803,941 | 4/1974 | Yoshikkawa | 74/543 X |
| 4,088,008 | 5/1978 | Watting et al. | 403/328 X |
| 4,088,040 | 5/1978 | Ross-Myring | 74/501 |
| 4,193,318 | 3/1980 | Golobay | 74/489 |
| 4,378,819 | 4/1983 | Macho | 403/328 X |
| 4,391,160 | 7/1983 | Myers | 403/328 X |
| 4,548,092 | 10/1985 | Strong | 74/489 X |

FOREIGN PATENT DOCUMENTS

| | | | |
|---|---|---|---|
| 471094 | 7/1914 | France | 74/489 |
| 600783 | 2/1926 | France | 74/501 |
| 837148 | 11/1938 | France | 403/328 |
| 22374 | of 1902 | United Kingdom | 74/489 |
| 19971 | of 1904 | United Kingdom | 403/328 |

Primary Examiner—Gary L. Smith
Assistant Examiner—Rodney M. Lindsey
Attorney, Agent, or Firm—Thomas Schneck

[57] ABSTRACT

A control lever for motorcycle handlebars and the like has a dislocating pivot. A cable connected to the lever transmits a controlling force to a brake, clutch, or other machine. The pivot is a two-pronged fork element and a central element pivotally connected at a pair of joints, one joint for each prong of the fork element. A joint is a cylindrical rod with a hemispherical or other shaped end, and a socket with a cavity shape suitable to the rod end. A spring pushes a rod into engagement within a socket. A lip partially around the opening of the cavity defines the range of allowable twisting motion of the lever arm. When the lever is forced out of the direction of its normal motion, the pivot elements dislocate, preventing damage to the lever. The force required for dislocation depends on the spring bias against the rod, the shape of rod end, and the depth of the socket cavity.

19 Claims, 9 Drawing Figures

BREAKAWAY CONTROL LEVERS

This is a continuation of co-pending application Ser. No. 726,791, filed on Apr. 24, 1985, now abandoned.

DESCRIPTION

1. Technical Field

The invention relates to control levers and in particular to hand-operated control levers and their pivots.

2. Background Art

Motorcycles typically have control levers, such as brake levers and clutch levers, attached to their handlebars. These levers are frequently broken during falls, especially when the motorcycles are used off-road. Further, motorcycle drivers can be injured during an accident, in some cases seriously, by impact with controls mounted to the handlebars.

U.S Pat. No. 4,088,040 to Ross-Myring discloses a cable actuating lever which is operable when shifted in any direction. The danger of breakage or other damage is reduced due to its capability to flex in any direction.

In U.S. Pat. No. 3,561,281, Wilfert discloses a control lever having two interconnected sections. The sections are held together by a plug fitted into an undercut groove and disconnect in response to a sudden shock-like load.

Brake and clutch levers should have a very defined control motion in normal operation, yet should yield when subjected to abnormal forces. Further, they should be easy to restore afterwards to normal operation quickly and without special tools.

The lever in the patent to Ross-Myring sacrifices defined control motion in favor of safety and reliability. The lever of Wilfert is not easy to reconnect after the sections dislocate.

It is an object of the invention to provide a control lever having very defined control motion in normal operation, but a lever which yields to prevent breakage or injury when subjected to abnormal forces. It is another object of the invention to provide a lever that can be restored to normal operation after yielding quickly, easily and without special tools.

DISCLOSURE OF INVENTION

The above objects have been met with a control lever, such as a brake or clutch lever attached to motorcycle handlebars, which is mounted in a spring-loaded or otherwise biased pivot. The pivot defines an axis and the lever normally moves in a plane perpendicular to that axis. Whenever the lever is subjected to an abnormal force, such as impact with the ground in a fall or other accident, the lever moves out of the normal operating plane, exerting a torque on the pivot. If the lever moves too far out of the plane, it will pop out of the pivot to prevent breakage of the lever or injury to the operator.

The lever can quickly be restored to normal operation by reattaching the lever to the pivot. The pivot assembly is made up of a pair of cylindrical rods, each having a hemispherical, conical or other shaped end, held by one or more springs in correspondingly shaped sockets. Either the lever or the fixed part of the assembly may contain the sockets, while the other part contains the spring-loaded rods. A lip partly surrounds the socket opening to define the range of direction of normal lever motion. When the lever moves in an abnormal direction, the shaped rod ends dislocate from the socket. The amount of force required to cause dislocation depends on the spring pressure, the depth of the socket and the shape of the rod end.

The control lever may be used as a handoperated lever on handle bars, such as brake and clutch levers on motorcycles. The lever disengages from the handlebars on impact with the ground during a fall or during another accident to prevent the lever from bending or breaking and to prevent injury to a rider. The lever remains connected to the actuating cable, so the lever can quickly be restored to normal operation by simply reinserting the spring-loaded rods into the sockets. These features are particularly advantageous for motorcycles driven off-road, where falls are common.

This control lever can be used in its present form on bicycles or other vehicles, and in modified form as a security lock or as a safety lock. For example, the lever can be used to actuate other devices and then be removed to prevent unauthorized use of the devices. Also, the lever may be used where only a certain amount of force should be applied to actuate a machine The lever would dislocate when excessive force is applied, preventing the operator from damaging the machine.

BEST MODE FOR CARRYING OUT THE INVENTION

Figure 1:
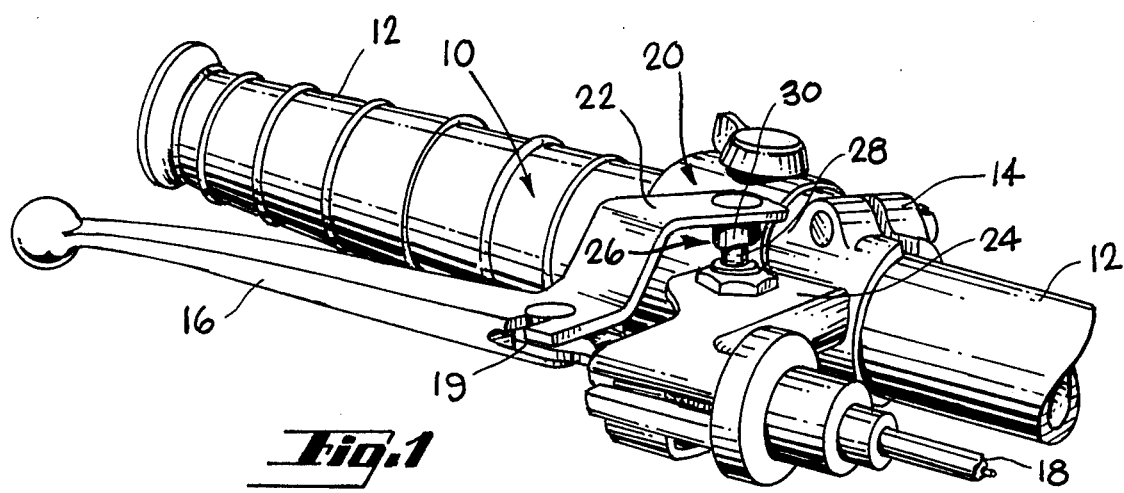
FIG. 1 is a perspective view of a lever of the present invention.

With reference to FIG. 1, a breakaway control lever 10 is connected to a handlebar 12 by a clamp 14. Alternatively, lever 10 may connect to a part other than handlebar 12. Lever 10 may also be connected by means other than clamp 14, such as by a bolt, rivet or weld. Lever 10 is usually hand operated. Lever 10 is made up of a lever arm 16, a cable 18 attached to lever arm 16 at a connector 19, and a pivot 20. Lever 10 is actuated by pulling the free end of lever arm 16 toward handlebar 12 so as to transmit a controlling force via cable 18 to a load, such as a cable-operated brake or clutch. Lever parts 16, 18 and 20 may be connected to make any of the three classes of lever. In FIG. 1, for example, pivot 20 attaches to one end of lever arm 16, while cable 18 attaches between the two ends of lever arm 16. This class of lever is preferred for handlebar-type control levers. Alternatively, cable 18 may attach to an end of lever arm 16, with pivot 20 attaching either between the two ends of lever 16 or to the opposite end of lever arm 16 from cable 18.

Pivot 20 consists of a two-pronged fork member 22 and a central member 24 movably coupled at a pair of joints 26, only one of which is seen in FIG. 1. One joint 26 couples the first prong of fork 22 to one side of central member 24, while the other joint, not seen, couples the second prong of fork 22 to the opposite side of central member 24. In FIG. 1, the central member 24 is fixed to handlebar 12 by clamp 14, while fork member 22 is part of lever arm 16 and is movable about the pivot joints 26. Alternatively, the fork member may be fixed, while the central member is part of the lever arm and is movable about the joints.

Each joint 26 is a cylindrical rod 28 engaging a socket 30. The rod 28 is spring-loaded or otherwise biased, i.e. forced, and has a shaped end which fits into a suitably shaped cavity of socket 30. One of the joint members 28 or 30 is contained by fork member 22, while the other joint member is contained by central member 24. In FIG. 1, for example, rod 28 is contained in central member 24, while socket 30 is part of a prong of fork member 22. Alternatively, rod 28 may be contained in a prong of fork member 22 with socket 30 being part of central member 24. The other joint, not seen, is arranged similarly with respect to the second prong of fork member 22 and the opposite side of central member 24.

Figure 2:
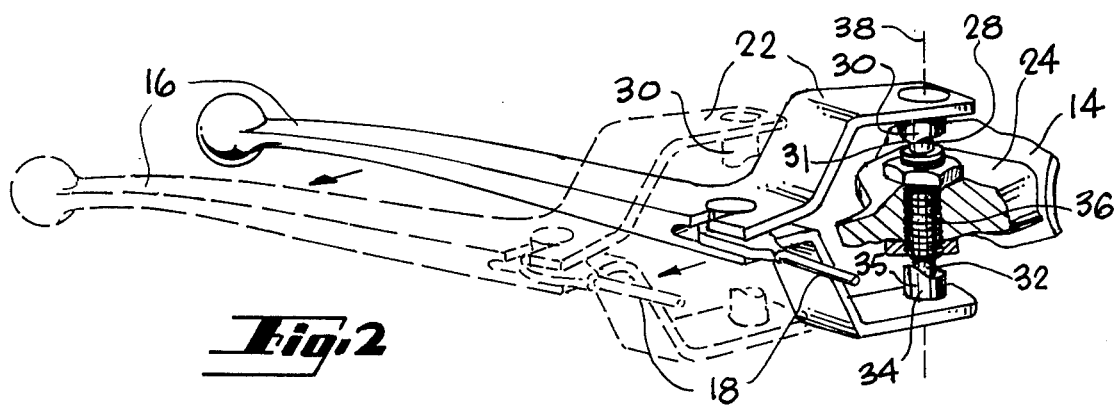
FIG. 2 is a cutaway view showing dislocation of a lever of the present invention.

Control lever 10 breaks away from handlebars 12 when subjected to an abnormal force. The pivot 20 defines an axis 38, as seen in FIG. 2. The lever normally moves in a plane perpendicular to axis 38. A lip 31 on socket 30 and a lip 35 on socket 34 define the range of direction that lever 10 may normally move. When the lever is subjected to an abnormal force, the lever arm 16 moves out of the operating plane, exerting a torque on the pivot. If the lever arm moves too far out of the plane, rods 28 and 32 will disengage from sockets 30 and 34, and the lever will pop out of the pivot. The phantom line lever in FIG. 2 indicates the dislocated lever. The fixed member, in this case central member 24, including rods 28 and 32 and spring 36, remains attached to the part clamped by clamp 14. The movable member, in this case fork member 22, including sockets 30 and 34, is attached to lever arm 16 and is dislocated. The dislocated lever arm 16 remains attached to cable 18.

Figure 3:
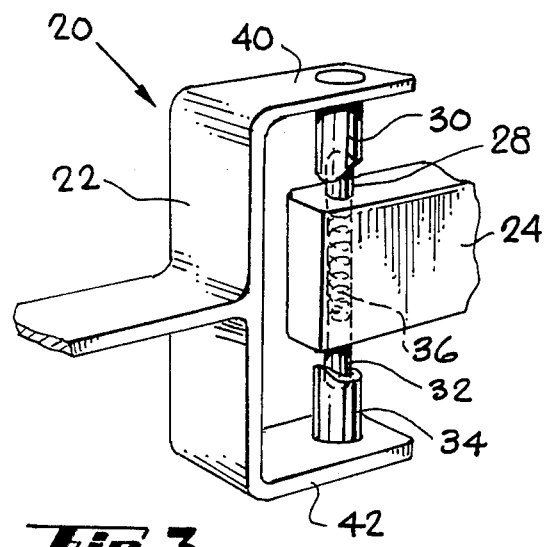
FIG. 3 is a perspective transparent view of one embodiment of a pivot of the present invention.

In FIG. 3, a pivot has a forked member 22 with a first prong 40 and a second prong 42. Sockets 30 and 34 are attached to the inside edges of prongs 40 and 42 respectively. A central member 24 has a pair of spring-loaded cylindrical rods 28 and 32. A spring 36 forces rods 28 and 32 into engagement with sockets 30 and 34 respectively. Fork member 22 may be fixed, while central member 24 is part of the lever arm and is movable. Alternatively, fork member 22 may be a movable part of the lever arm, while central member 24 is fixed.

Figure 4:
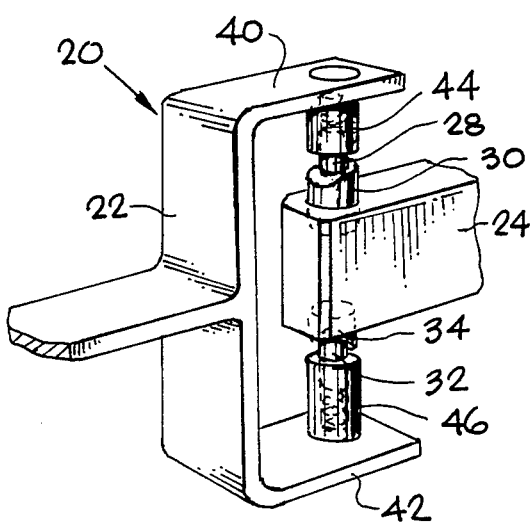
FIG. 4 is a perspective transparent view of another embodiment of a pivot of the present invention.

In FIG. 4, a pivot 20 is identical to the pivot of FIG. 3, except that rods and sockets are reversed. Fork member 22 has rods 28 and 32, while central member 24 has sockets 30 and 34. A pair of springs 44 and 46 push against rods 28 and 32 respectively, forcing them into engagement with sockets 30 and 34 respectively. As with the pivot 20 in FIG. 3, fork member 22 may be fixed with central member movable, or fork member 22 may be movable with central member 24 fixed.

Figure 5:
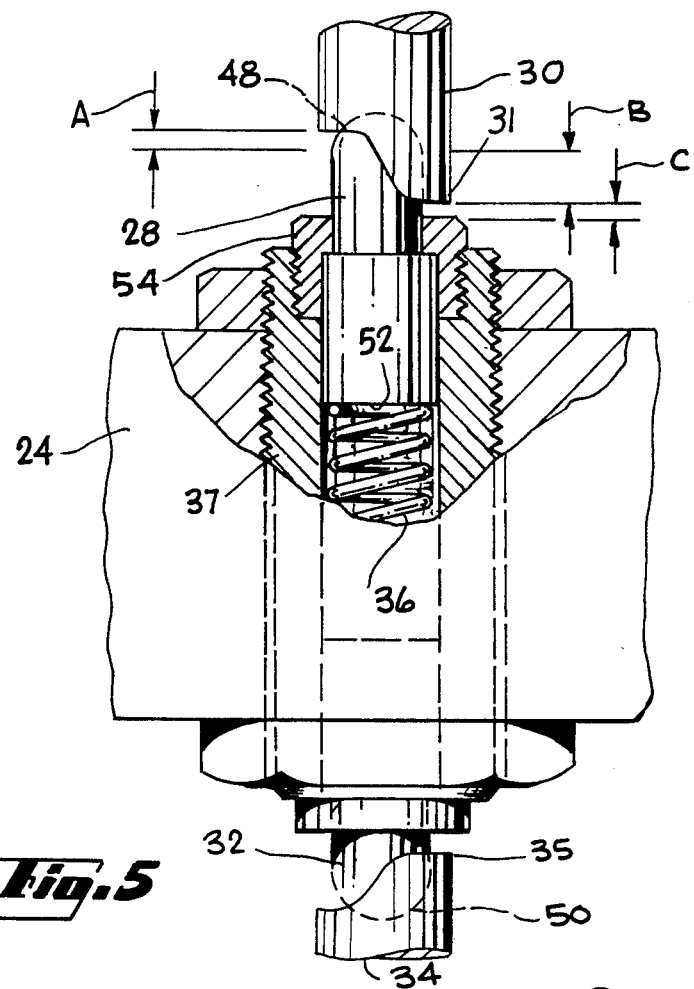
FIG. 5 is a side cutaway view of the pivot of FIG. 3.
Figure 6:
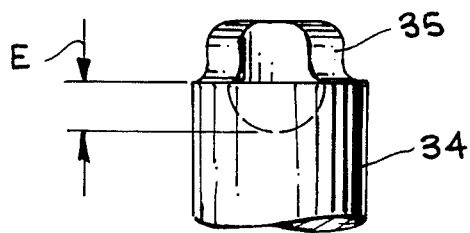
FIG. 6 is a front view of a socket of the present invention.
Figure 7:
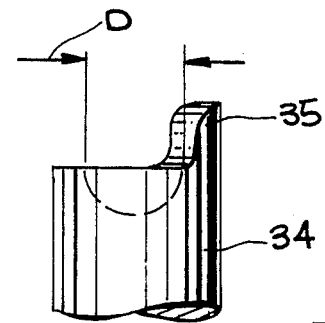
FIG. 7 is a side view of a socket of the present invention.
Figure 8:
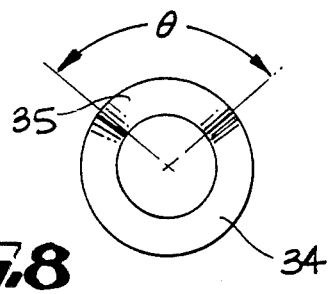
FIG. 8 is a top view of the socket of FIG. 6.
Figure 9:
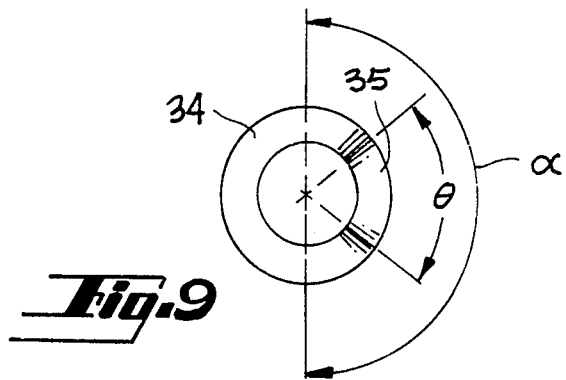
FIG. 9 is a top view of the socket of FIG. 7.

With reference to FIG. 5, a central member 24 contains spring-loaded rods 28 and 32 projecting therefrom on opposite sides. The rods 28 and 32 are generally cylindrical in shape having ends 48 and 50 that are hemispherical. The ends 48 and 50 may also be conical, or some other shape. Shaped ends 48 and 50 engage sockets 30 and 34 respectively, which have cavities that are suitably shaped to receive ends 48 and 50. Sockets 30 and 34 have lips 31 and 35 which partially surround the sockets' openings. A spring 36 is inside a cylindrical tube 37 that is screwed into central member 24. Tube 37 may also be an integral part of member 24. Spring 36 presses against the bottom 52 of rod 28 forcing it into engagement with socket 30. Spring 36 similarly presses rod 32 into engagement with socket 34. A retaining nut 54, screwed into tube 37, keeps rod 28 from popping completely out of central member 24. A similar retaining nut secures rod 32. These two retaining nuts may be replaced by other suitable retainers.

Dimension A is the distance from the plane where rod 28 stops being cylindrical in shape and becomes hemispherical in shape to the opening of socket 30. If D is the diameter of the socket cavity, then A must be greater than zero and less than one-half D. If A is equal to one-half D, then for a hemispherical rod and socket cavity, the cavity vanishes and the lever is unrestrained and falls off. If A is equal to zero, then there is maximum resistance to removal.

Dimension B is the distance from the plane where rod 28 begins to be cylindrical in shape to the top of the lip 31. The height of the lip 31 is the sum of A and B. The greater B is, the greater the strength of the lever in the direction of normal operation. In practice, mechanical clearances should be taken into account, so B should be on the order of one-half D or greater.

Dimension C is the clearance between the top of lip 31 to restraining nut 54. Dimension C must be less than the maximum distance the rod can come out of bore tube 37 from the surface of nut 54. Otherwise, rod 28 can never reach socket 30.

In FIGS. 6,7,8 and 9 a socket 34 has a lip 35, and dimensions D,E,$\theta$ and $\alpha$. Dimension D is the diameter of the socket cavity. Dimension E is the depth of cavity, measured from the opening. The sum of A and E is one-half D. The angle $\theta$ indicates the angle over which lip 35 extends. The greater this angle, the greater the range of normal motion and the smaller the range of angle that the lever can be dislocated. For example, if $\theta = \alpha$, the lever can be dislocated only by a force applied from the left side of FIG. 9. The angle $\theta$ should not be so large that the gap between the lip ends is smaller than cavity diameter D, else the lever can only be dislocated by a blow breaking lip 35.

I claim:

1. A breakaway control lever comprising,
a lever arm,
a load-transmitting means attached to said lever arm for transmitting a controlling force to a mechanism, and
a pivot having a two-pronged fork element and a central element, one of said elements being fixed, the other of said elements being linked to said lever arm, said two-pronged fork element and said central element being movably connected to and spaced apart from each other by a pair of impact dislocating joints, each of said joints being a shaped member in one of said elements engaging a socket in the other of said elements, each of said sockets having structure defining a cavity and a cavity opening, each of said shaped members having a cylindrical body and an engagement end, said engagement ends each being at least partially defined by a tapering segment, each of said cavities of said sockets being shaped to receive said shaped member, the cavity opening of each of said sockets being partially surrounded by a lip and being in engagement with a tapering segment of said engagement ends, said lip of each socket extending a distance beyond the cavity opening toward said one element and defining a range of normal motion, said joint also having at least one biasing means for pushing said shaped member into engagement with said sockets, said joints automatically and nondestructively dislocating upon an impact causing movement of said pivot beyond said range of normal motion.

2. The lever of claim 1 wherein said load-transmitting means is attached to said lever arm between one end of said lever arm and the opposite end of said lever arm, and said element of said pivot is linked to said lever are at said one end of said lever arm.

3. The lever of claim 1 wherein said fixed element of said pivot is said central element, and said element of said pivot linked to said lever arm is sid two-pronged fork element.

4. The lever of claim 1 wherein said element containing said shaped members is said two-pronged fork element, and said element containing said sockets is said central element.

5. The lever of claim 1 wherein said element containing said shaped members is said central element, and said element containing said sockets is said two-pronged fork element.

6. The lever of claim 1 wherein said shaped members are cylindrical rods having hemispherical engagement ends and said lips each have an arcuate inner surface disposed to contact a portion of the circumference of the cylindrical rod adjacent the hemispherical end of an associated cylindrical rod, said structure of the sockets each defining said cavity to have an inner extremity having a hemispherical contour to accept a portion of said hemispherical engagement end of a cylindrical rod.

7. The lever of claim 1 wherein said load-transmitting means is a cable.

8. The lever of claim 1 wherein said biasing means is at least one helical spring inside said element containing said shaped members, said spring engaging an end of said rods opposite said engagement end.

9. A pivot for a breakaway lever comprising,
a central element, a two-pronged fork element, and a pair of impact dislocating joints movably connecting said central element and said fork element, one of said elements being fixed, each of said joints being a cylindrical rod in one of said elements engaging a socket and a lip in the other said element, each of said rods having a tapered end, each of said sockets having structure defining a cavity and a cavity opening, each of said cavities having an inner extremity being shaped to receive a portion of a tapered end of one of said rods, the cavity opening of each of said sockets being partially surrounded by a lip having an arcuate surface shaped to receive a portion of the circumference of said cylindrical rod, said lips extending a distance beyond the cavity opening toward said one element and defining a range of normal motion, said joint also having at least one biasing means for pushing rods into engagement with said sockets, said joints automatically and nondestructibly dislocating upon an impact causing movement of said central element and said fork element beyond said range of normal motion.

10. The pivot of claim 9 wherein said element containing said cylindrical rods is said two-pronged fork element, and said element containing said sockets is said central element.

11. The pivot of claim 9 wherein said element containing said cylindrical rods is said central element, and said element containing said sockets is said two-pronged fork element.

12. The pivot of claim 10 wherein said biasing means comprises first and second springs, each spring in a prong of said fork element in engagement with an end of one of said cylindrical rods that is opposite said shaped end.

13. The pivot of claim 11 wherein said biasing means comprises a spring having two ends in said central element in engagement with both said cylindrical rods, one end of said spring engaging an end opposite said shaped end of one of said cylindrical rods, the other end of said spring engaging an end opposite said shaped end of the other of said cylindical rods.

14. A breakaway control lever comprising,
a lever arm,
a load-transmitting means attached to said lever arm for transmitting a controlling force to a mechanism, and
a pivot defining a pivot axis, said pivot having a two-pronged fork element and a central element, one of said elements being fixed, the other of said elements being linked to said lever arm, said two-pronged fork element and said central element being movably connected to each other by a pair of impact dislocating joints, said joints defining a first normal range of lever arm motion perpendicular to said pivot axis, said load-transmitting means attached to said lever arm to define at least one extremity of said first normal range of lever are motion, each of said impact dislocating joints being a cylindrical rod in one of said elements engaging a socket and a socket lip in the other of said elements, each of said sockets having structure defining a cavity and a cavity opening and each of said cylindrical rods having a hemispherical engagement end, each of said cavities being shaped to receive a portion of an engagement end of an associated cylindrical rod, the cavity opening of each of said sockets being partially surrounded by said socket lips, said socket lip extending a distance beyond the cavity opening toward said one element, said joint also having at least one biasing means for pushing said cylindrical rods into engagement with said sockets, said socket and said socket lip permitting mechanical play to define a second normal range of lever arm motion substantially parallel said pivot axis, said joints self-actingly and nondestructively dislocating upon an impact causing a movement of said lever arm beyond a normal range of lever arm motion.

15. The pivot of claim 14 wherein said element containing said cylindrical rods is said two-pronged fork element, and said element containing said sockets is said central element.

16. The pivot of claim 14 wherein said element containing said cylindrical rods is said central element, and said element containing said sockets is said two-pronged fork element.

17. The pivot of claim 15 wherein said biasing means comprises first and second springs, each spring in a prong of said fork element in engagement with an end of one of said cylindrical rods.

18. The pivot of claim 16 wherein said biasing means comprises a spring having two ends in said central element in engagement with both said cylindrical rods.

19. The lever of claim 14 wherein said lips each have an inner surface having a contour substantially similar to the contour of said cylindrical rods, said cavities of the sockets each having an inner extremity having a hemispherical contour to accept a portion of a hemispherical engagement end of a cylindrical rod, said inner surface of said lips being flush with the contour of said cavities at said cavity openings.

* * * * *

UNITED STATES PATENT AND TRADEMARK OFFICE
CERTIFICATE OF CORRECTION

PATENT NO. : 4,730,509
DATED : March 15, 1988
INVENTOR(S) : Robert S. Hornady

It is certified that error appears in the above—identified patent and that said Letters Patent is hereby corrected as shown below:

Claim 2, column 5, line 13, "to said lever are" should read - -to said lever arm- -.

Claim 3, column 5, line 17, "is sid two-pronged" should read - -is said two-pronged- -.

Claim 14, column 6, line 35, "lever are motion" should read - -lever arm motion- -.

Signed and Sealed this

Twelfth Day of July, 1988

Attest:

DONALD J. QUIGG

Attesting Officer

Commissioner of Patents and Trademarks